(12) United States Patent
Matsuo et al.

(10) Patent No.: US 6,269,854 B1
(45) Date of Patent: Aug. 7, 2001

(54) PNEUMATIC TIRE INCLUDING DISCHARGE TERMINAL PARTS

(75) Inventors: Toshio Matsuo, Kakogawa; Yoshiki Nakagawa, Nagoya, both of (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 08/953,557

(22) Filed: Oct. 17, 1997

(30) Foreign Application Priority Data

Oct. 17, 1996 (JP) .................................... 8-274933

(51) Int. Cl.$^7$ .............................. B60C 1/00; B60C 11/00; B60C 19/08
(52) U.S. Cl. ................................... 152/152.1; 152/209.5; 152/DIG. 2
(58) Field of Search ................ 152/151, 152.1, 152/209 R, 209 D, DIG. 2, 209.5, 905

(56) References Cited

U.S. PATENT DOCUMENTS

| | | | |
|---|---|---|---|
| 4,478,266 | * 10/1984 | Pierson et al. | 152/209.5 |
| 4,739,811 | * 4/1988 | Rampl | 152/209 R |
| 5,518,055 | 5/1996 | Teeple et al. | |
| 5,718,781 | * 2/1998 | Verthe et al. | 152/209 R |

FOREIGN PATENT DOCUMENTS

| | | |
|---|---|---|
| 0104133 | 3/1984 | (EP) . |
| 0658452 | 6/1995 | (EP) . |
| 0705722 | 4/1996 | (EP) . |
| 0715974 | 6/1996 | (EP) . |
| 718126 | * 6/1996 | (EP) ................ 152/DIG. 2 |
| 718127 | * 6/1996 | (EP) ................ 152/DIG. 2 |
| 732229 | * 9/1996 | (EP) ................ 152/209 R |
| 544757 | * 4/1942 | (GB) ................ 152/152.1 |
| 670250 | * 10/1964 | (IT) ................ 152/DIG. 2 |
| 56-79004 | * 6/1981 | (JP) ................ 152/209.5 |
| 57-51504 | * 3/1982 | (JP) ................ 152/209.5 |
| 8-120120 | 5/1996 | (JP) . |

\* cited by examiner

*Primary Examiner*—Steven D. Maki
(74) *Attorney, Agent, or Firm*—Birch, Stewart, Kolasch & Birch, LLP (57) ABSTRACT

A pneumatic tire has a tread portion including a tread cap rubber defining the tread face and a tread base rubber disposed radially inside the tread cap. The tread base rubber includes a collector part which is disposed radially inside the tread cap rubber, and discharge terminal parts each of which extends radially outwardly from the collector part to the tread face, penetrating the tread cap rubber. The insulation rubber material is compounded from: 100 parts by weight of a rubber base comprising one or more materials selected from diene rubber and copolymers of a conjugated diene monomer and an aromatic vinyl compound; 30 to 100 parts by weight of silica; and 3 to 20 parts by weight of carbon black. The first electrically conductive rubber material is compounded from: 100 parts by weight of a rubber base comprising one or more materials selected from diene rubber and copolymers of a conjugated diene monomer and an aromatic vinyl compound; 0 to 50 parts by weight of silica; and not less than 25 parts by weight of carbon black. The hardness Hs1 of the insulation rubber material is not more than the hardness Hs2 of the first electrically conductive rubber material at a temperature of 25 degrees C.

9 Claims, 4 Drawing Sheets

PNEUMATIC TIRE INCLUDING DISCHARGE TERMINAL PARTS

The present invention relates to a pneumatic tire improved in the rolling resistance and electrical conductivity between the tread and road surface.

In recent years, to decrease fuel consumption and exhaust gas of the automobiles, there is a strong demand for a tire having a low rolling resistance.

In Japanese patent application No. JP-A-8-120120 and U.S. Pat. No. 5,518,055, tires are disclosed, wherein the tread rubber contains silica as a reinforcing agent for the rubber instead of carbon black to decrease the rolling resistance. However, since the rubber with a silica base is very high in electrical resistance, which is almost insulation, the vehicle body is liable to have static electricity of a high voltage during running. Thus, there are problems: for example, there is a danger of sparking when the fuel lid is opened; the driving control computers become out of order; the radio becomes noisy and the like. In the disclosed tires, therefore, to provide an electrical conductivity, a thin layer made of rubber reinforced by carbon black is disposed outside the silica base tread rubber along the tread face. In this arrangement, however, as the thin outer layer is worn out, tire performance is greatly altered. Especially, when the worn states are different among the four wheels of a vehicle, handling of the vehicle during cornering and at the time of breaking and the like become unstable and very dangerous. Further, after the thin outer layer is completely worn out, the electrical resistance becomes very high and the situation returns to that wherein the primary problem is not solved.

It is therefore, an object of the present invention to provide a pneumatic tire, in which the rolling resistance is decreased, and a good electrical conductivity of the tire is maintained from beginning to end of the tread wear life.

According to one aspect of the present invention, a pneumatic tire includes a tread portion, a pair of sidewall portions, a pair of bead portions with a bead core therein, a carcass extending between the bead portions through the tread portion and the sidewall portions, a belt disposed radially outside the carcass and inside the tread portion, the tread portion comprising a tread cap rubber defining the tread face and a tread base rubber disposed radially inside the tread cap rubber, the tread base rubber comprising a collector part disposed radially inside the tread cap rubber and discharge terminal parts extending radially outwardly from the collector part to the tread face, penetrating the tread cap rubber, the tread cap rubber made of an insulation rubber material the volume resistivity of which is not less than $1 \times 10^8$ ohm cm, the insulation rubber material compounded from 100 parts by weight of a rubber base comprising one or more materials selected from diene rubber and copolymers of a conjugated diene monomer and an aromatic vinyl compound, 30 to 100 parts by weight of silica, and 3 to 20 parts by weight of carbon black, the tread base rubber made of a first electrically conductive rubber material the volume resistivity of which is not more than $1 \times 10^7$ ohm cm, the first electrically conductive rubber material compounded from 100 parts by weight of a rubber base comprising one or more materials selected from diene rubber and copolymers of a conjugated diene monomer and an aromatic vinyl compound, 0 to 50 parts by weight of silica, and not less than 25 parts by weight of carbon black, the hardness Hs1 of the insulation rubber material being not more than the hardness Hs2 of the first electrically conductive rubber material at a temperature of 25 degrees C., and an electrical conductor extending from the collector part to the bead portions.

Accordingly, the rolling resistance and wet performance are improved by mainly the tread cap rubber, and a good electrical conductivity is provided by the tread base rubber. Such improved characteristics can be maintained from beginning to end of the tread wear life, without sacrificing the steering stability and the like.

Embodiments of the present invention will now be described in detail in conjunction with the accompanying drawings.

Figure 1:
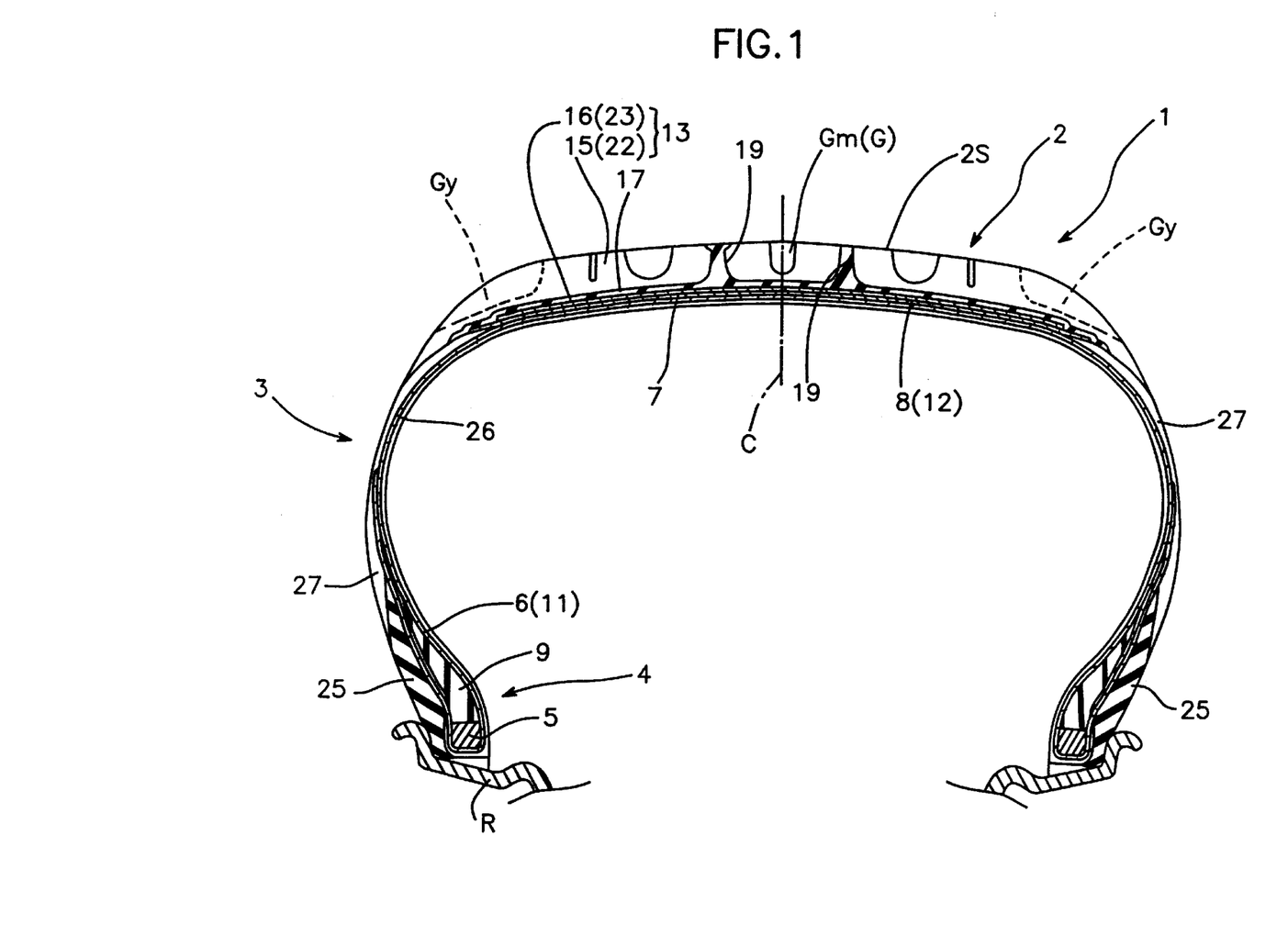
FIG. 1 is a cross sectional view of an embodiment of the present invention.

The pneumatic tire 1 comprises a tread portion 2, a pair of sidewall portions 3, a pair of bead portions 4, a toroidal carcass 6 extending between the bead portions 4 through the tread portion 2 and sidewall portions 3, and a belt 8 disposed on the radially outside of the carcass 6 in the tread portion 2.

FIG. 1 shows a meridian section of the tire under a standard unloaded state in which the tire is mounted on a standard rim R and inflated to 80% of the maximum inner pressure for the maximum tire load. Here, as the above-mentioned standard rim, maximum inner pressure and maximum tire load, those specified in well-known standards such as JATMA (Japan), TRA (USA), ETRTO (Europe) and the like should be used.

The carcass 6 comprises at least one ply, in this embodiment a single ply of cords extending between the bead portions 4 through the tread portion 2 and sidewall portions 3 and turned up around a bead core 5 in each bead portion 4. The carcass cords are arranged radially at an angle of from 75 to 90 degrees with respect to the tire equator C and coated with a topping rubber 11.

For the carcass cords, steel cords and organic fiber cords, e.g. nylon, rayon, polyester and the like can be used.

In each bead portion between the turnup part and main part of the carcass 6, a rubber bead apex 9 is disposed to increase the tire lateral stiffness.

Figure 2:
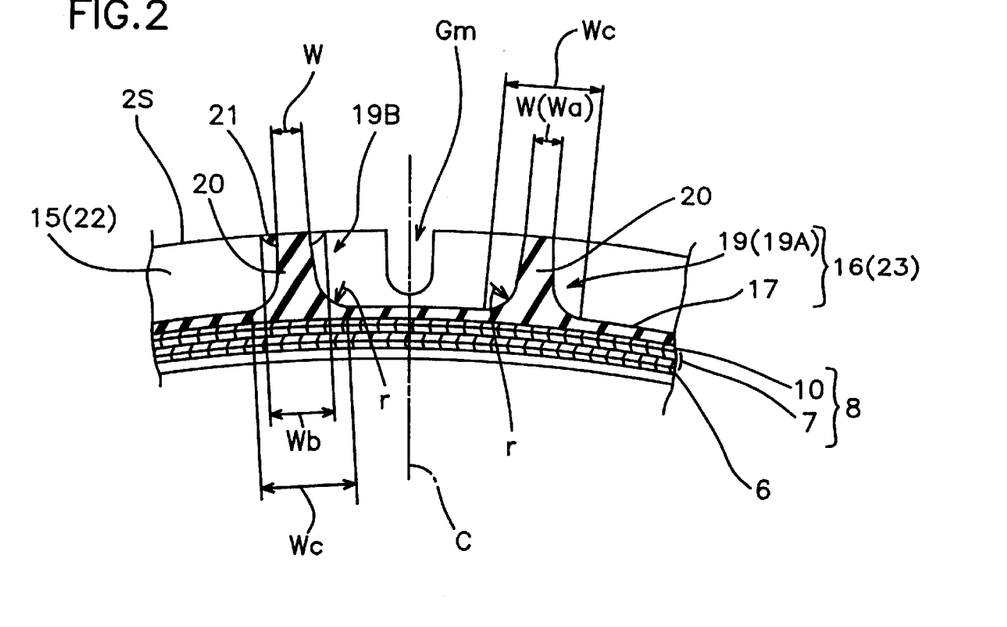
FIG. 2 is a cross sectional view of the tread portion showing the discharge terminal parts.

As shown in FIG. 2, the belt 8 in this embodiment comprises a breaker belt 7 disposed on the radially outside of the carcass, and a band belt 10 disposed radially outside the breaker belt 7.

The breaker belt 7 comprises two plies of steel cords laid at an angle of from 10 to 30 degrees with respect to the tire equator C such that the cords in each ply are parallel with each other but crosswise to the next ply cords.

The band belt 10 comprises one ply of spiral windings of at least one organic fiber cord, e.g. nylon, rayon, polyester and the like. In this example, the band belt 10 extends across the overall width of the breaker belt 7, but it may be possible to cover only the axial edges of the breaker belt 7.

The belt plies and band ply are coated with a topping rubber 12.

Radially outside the crown portion of the carcass, a tread rubber 13 is disposed to define the tread portion 2. The tread portion 2 is provided within the tread width with tread grooves G, e.g. circumferential grooves Gm and axial grooves Gy to form a tread pattern.

The tread rubber 13 comprises a radially outer tread cap rubber 15 defining the tread face, and a radially inner tread base rubber 16.

The tread cap rubber 15 extends axially over the tread width, and the thickness thereof is not less than the maximum depth of the tread grooves G.

The tread base rubber 16 comprises a collector part 17 disposed on the radially outside of the belt 8 and a plurality of discharge terminal parts 19.

The collector part 17 has a substantially constant thickness and extends axially outwardly beyond the edges of the belt 8, contacting with the radially inside of the tread cap rubber 15.

To prevent the collector part 17 from coming out when the tread cap rubber 15 is worn out, the collector part 17 is made relatively thin such that the volume V2 of the tread base rubber 16 is not more than 0.5 times the volume V1 of the tread cap rubber 15.

The discharge terminal parts 19 extend from the radially outside of the collector part 17 to the tread face 2S, penetrating the tread cap rubber 15. Thus, the surfaces of the outer ends of the discharge terminal parts 19 forms part of the tread face 2S.

The discharge terminal parts 19 are disposed on both sides of the tire equator C. Preferably, they are disposed in a tread central part where the ground pressure is relatively high.

As shown in FIGS. 1 and 2, the discharge terminal part 19 has a main part 20 whose thickness decreases radially outwards from the collector part 17.

The main part 20 is, at the root, continued to the collector part 17 by an arc to prevent a stress concentration. The radius (r) of this arc is preferably in the range of from 0.5 to 2.0 times the thickness or axial width W of the main part 20 at the radially outer end.

Preferably, the width W is in the range of from 0.2 to 0.8 times the maximum width Wc at the root.

Figure 3:
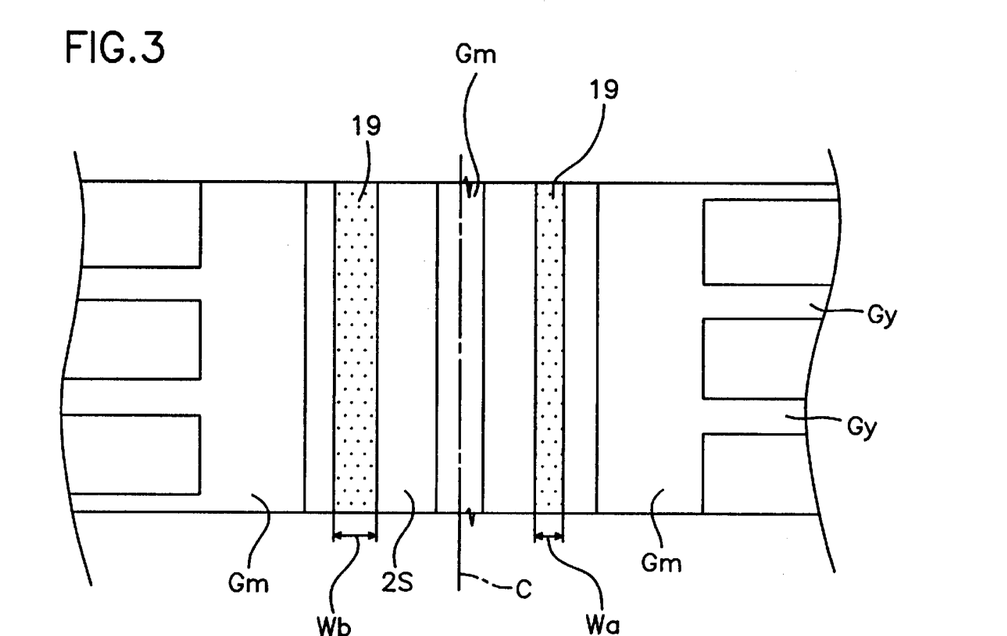
FIG. 3 is a plan view of the tread portion showing an example of the tread pattern.

In this embodiment, the discharge terminal parts extend continuously in the tire circumferential direction like a rib, as shown in FIG. 3.

Further, one of the discharge terminal parts 19A is composed of the main part 20 only. But, the other discharge terminal part 19B is composed of the main part 20 and a wide part 21 whose axial width is increased. Thus, it has a cross section like a mushroom, as shown in FIG. 2.

In the terminal part 19A, the radially outer end of the main part 20 forms part of the ground contacting area 2S. Thus, to maintain a necessary electrically conducive area, the width Wa thereof is set in the range of from 0.5 to 20.0 mm. If less than 0.5 mm, the electrical conductivity is lost. If more than 20 mm, physical properties of the tread base rubber 16 such as elasticity, rigidity and the like affect the rolling resistance and wet performance.

In the terminal part 19B, the neck part thereof can lessen the bad influence of the tread base rubber 16 on the rolling resistance and the like. Accordingly, the width Wb at the ground contacting area 2S may be increased to about 40 mm over the above-mentioned width Wa of the discharge terminal part 19A. Therefore, the electrical conductivity between the tire and road surface is provided even in the beginning of the tire use, in which the contact therebetween is usually not good and thus the electrical conductivity is liable to become worse.

The width W of the radially outer end of the main part 20 of the discharge terminal part 19B is less than the width Wa of the discharge terminal part 19A.

The above-mentioned tread cap rubber 15 is made of an insulation rubber material 22 having a volume resistivity of not less than $1 \times 10^8$ ohm cm.

The insulation rubber material 22 is compounded from: 100 parts by weight of rubber base comprising one or more materials selected from diene rubber and copolymers of a conjugated diene polymer and an aromatic vinyl compound; 30 to 100 parts by weight of silica; and 3 to 20 parts by weight of carbon black.

Here, as the main reinforcing agent, silica is used for both the rolling resistance and wet performance.

Additionally, for rubber-like elasticity, hardness and heat generation, carbon black is used as a secondary reinforcing agent. If the carbon black content is more than 20 parts by weight, the rolling resistance increases and the hardness increases excessively. If the silica content is more than 100 parts by weight, it becomes difficult to maintain the carbon black content of not less than 3 parts by weight which is necessary for the above-mentioned rubber-like elasticity, hardness and heat generation. As a result, the light oxidization preventing effect is decreased and the weathering resistance is lost.

The above-mentioned diene rubber includes natural rubber (NR), synthesis polyisoprene rubber (IR) which is an isoprene polymer, butadiene rubber (BR) which is a butadiene polymer, nitrile rubber (NBR) which is a copolymer of butadiene and acrylonitrile, chloroprene rubber (CR) which is a chloroprene polymer and the like. Especially, NR, IR and BR are preferably used.

As the above-mentioned copolymer of a conjugated diene monomer and an aromatic vinyl compound, copolymers of butadiene, isoprene or the like (as a conjugated diene monomer) and styrene, alpha methyl styrene or the like (as an aromatic vinyl compound) can be used. Preferably, the so called emulsion-polymerized styrene butadiene rubber (E-SBR) and solution-polymerized styrene butadiene rubber (S-SBR) are used. Accordingly, as the material base rubber for the insulation rubber material 22, a single or blend of two or more of the above-mentioned NR, IR, BR, SBR(E-SBR, S-SBR) can be used. Especially, it is preferable to include SBR, and in such case, the styrene content of the SBR is preferably 10 to 40%, more preferably 15 to 30% and the vinyl content thereof is preferably 10 to 70%, more preferably 15 to 60%. It is more preferable to include S-SBR of which vinyl content is 40 to 60%.

The above-mentioned tread base rubber 16 is made of a first electrically conductive rubber material 23 having a volume resistivity of not more than $1 \times 10^7$ ohm cm.

The first electrically conductive rubber material 23 is compounded from: 100 parts by weight of rubber base comprising one or more materials selected from diene rubber and copolymers of a conjugated diene polymer and an aromatic vinyl compound; 0 to 50 parts by weight of silica; and not less than 25 parts by weight of carbon black.

It is necessary for a good electrical conductivity of less than $1 \times 10^7$ ohm cm to add carbon black of not less than 25 parts by weight. It is possible to add silica for other purposes, but the silica content must be limited to not more than 50 parts by weight. If the silica content is more than 50 parts by weight, the wear resistance decreases and the heat generation increases to increase the rolling resistance.

Similarly to the above-mentioned insulation rubber material 22, as the material base rubber for the first electrically conductive rubber material 23, a single or blend of two or more of the above-mentioned NR, IR, BR, SBR(E-SBR, S-SBR) can be used. If SBR should be included, S-SBR is preferably used rather than E-SBR. Especially, S-SBR whose glass transition temperature Tg is not more than −50 degrees C. is preferable for rolling resistance. It is however, not always necessary to include SBR.

Further, as to the carbon black of the first electrically conductive rubber material 23, the ratio Cc/Nc of the content Cc (parts by weight) to the average particle diameter Nc (nm) is preferably set in the ranger of not less than 1.5 since the volume resistivity of the first electrically conductive rubber material 23 relates to the carbon black content Cc and average particle diameter Nc. In general, the volume resistivity is decreased by increasing Cc or decreasing Nc.

Preferably, hard carbon whose average particle diameter Nc is not more than 30 nm is used.

As to the first electrically conductive rubber material 23, the silica having a colloidal characteristic such that the surface area based on nitrogen absorption (BET) is in the range of from 150 to 250 $m^2/g$, and the dibutyl phthalate (DBP) oil absorptiveness is in the range of not less than 180 ml/100 g, is preferably used for rubber reinforcing effect and processability of the resultant rubber.

As to the insulation rubber material 22, it is possible to use carbon black and silica according to the above mentioned limitations. And, It is also possible to use those outside the limitations.

In the insulation rubber material 22, the first electrically conductive rubber material 23, and the undermentioned second electrically conductive rubber material 26, vulcanizing agent, vulcanization accelerator, accelerator activator, plasticizer, age resistor, silane coupling agents and the like can be used additionally.

For the silane coupling agents, vis(triethoxysilylpropyl) tetrasulfide and alpha-mercaptpropyltrimethoxysilane are preferably used.

As to the tread rubber 13, to maintain the steering stability, the hardness Hs1 of the insulation rubber material 22 is not more than the hardness Hs2 of the first electrically conductive rubber material 23 at a temperature of for example 25 degrees C.

If Hs1>Hs2, the cornering force decreases, and the handling response and straight running stability are deteriorated. Further, the electrical contacting between the discharge terminal parts 19 and the road surface becomes worse.

If the minimum width Wa of the discharge terminal parts 19 exceeds 20.0 mm, the ground contacting area of the tread cap rubber 15 decreases, and the effect on decreasing the rolling resistance by the use of silica decreases.

In order that the discharge terminal parts 19 can always keep a larger ground pressure than the surrounding tread cap rubber 15, preferably the wear resistance K2 of the first electrically conductive rubber material 23 is more than the wear resistance K1 of the insulation rubber material 22. Here, the wear resistance is measured according to Japanese Industrial Standard (JIS) K6264. (load: 2.0 Kg, Slip rate: 40%)

The loss tangent δ2 of the first electrically conductive rubber material 23 is set in the range of not more than the loss tangent δ1 of the insulation rubber material 22, and the loss tangent δ2 is not less than 0.09, whereby the rolling resistance can be further improved, and the internal heat generation is decreased to improve the tread durability.

The loss tangent is measured under the following conditions: temperature 70 deg. C.; initial elongation 10%; dynamic distortion plus/minus 1.0%; and frequency 10 Hz. Usually, the loss tangent δ1 of the insulation rubber material 22 is not more than 0.24.

The tire 1 is further provided in each bead portion 4 with a clinch rubber 25, defining the axially outer surface of the bead portion and bead bottom. The clinch rubber 25 extends so as to contact with the flange and/or bead seat of the rim R when the tire is mounted thereon.

In this embodiment, the belt coating rubber 12, carcass coating rubber 11, sidewall rubber 27, and clinch rubber 25 are made of a second electrically conductive rubber material 26 having a volume resistivity of not more than $1 \times 10^7$ ohm cm similar to the first electrically conductive rubber material 23.

The second electrically conductive rubber material 26 is compounded from: 100 parts by weight of rubber base comprising one or more materials selected from diene rubber and copolymers of a conjugated diene polymer and an aromatic vinyl compound; 0 to 100 parts by weight of silica; and not less than 25 parts by weight of carbon black.

As to the carbon black of the second electrically conductive rubber material 26, the ratio Cc/Nc of the content Cc (parts by weight) to the average particle diameter Nc (nm) is set to be not less than 1.5 for the same reason as explained above.

As to the silica, the surface area based on nitrogen absorption (BET) is in the range of 150 to 250 $m^2/g$, and the dibutyl phthalate (DBP) oil absorptiveness is not less than 200 ml/100 g.

Further, the components made of the first and second electrically conductive rubber materials are arranged such that the collector part 17 contacts with the belt coating rubber 12 which contacts with the carcass coating rubber 11 and the sidewall rubber 27 which contact with the clinch rubber 25, whereby an electrically conductive path extending continuously from the discharge terminal parts 19 to the rim R is formed.

When the carcass coating rubber 11 and the sidewall rubber 27 are electrically connected in parallel with each other as shown in FIG. 1, it is possible that one of the carcass coating rubber 11 and sidewall rubber 27 is made of an insulation rubber material whose volume resistivity is more than $1 \times 10^7$ ohm cm. Further, when steel carcass cords are used, there is a possibility that both of them are made of an insulation rubber.

By the above-mentioned arrangement, the electric resistance of the tire is decreased to, for example, not more than $1 \times 10^8$ ohm cm when the tire is new and not more than $1 \times 10^9$ ohm cm after 1000 km running when measured under the above-mentioned 80% pressure and 80% of the maximum load.

Figure 6:
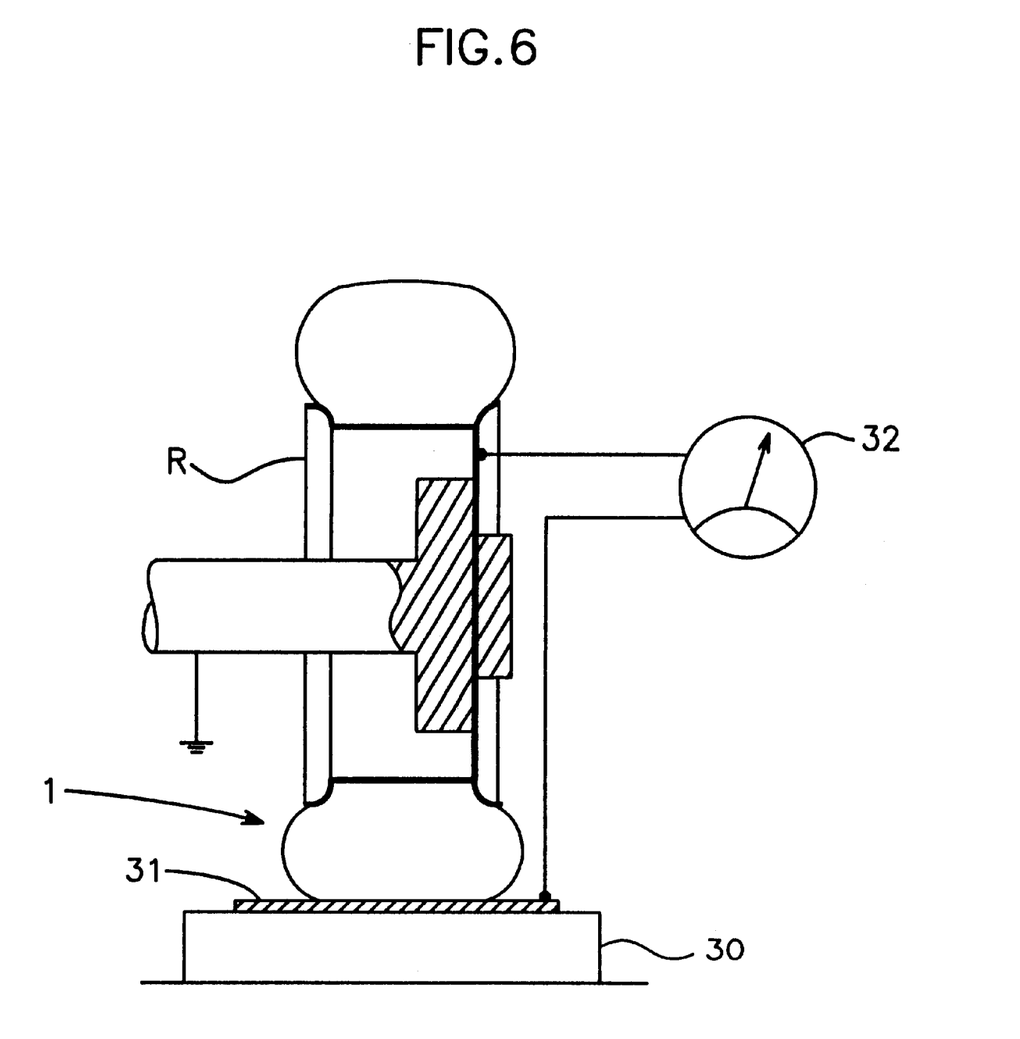
FIG. 6 is a diagram explaining a method of measuring the electric resistance of the tire.

Here, the electric resistance is measured according to a method, German W.d.K.—Leitline 110 Blatt 3 "Meβverfahren zur Bestimmung des elektrischen Ableitwiderstandes von Luftreifen unter Last". As shown in FIG. 6, the tire 1 is put on a steel board 31 isolated from a table, applying the above-mentioned standard load. And, applying a voltage of not less than 100 bolt between the metallic rim R and steel board 31, the electric resistance therebetween is measured with a resistance meter 32.

As explained above, the discharge terminal parts 19 shown in FIG. 3 are continuous in the tire circumferential direction. However, the discharge terminal parts 19 may be formed discontinuously by providing axial grooves Gy extending thereacross for example.

Figure 4:
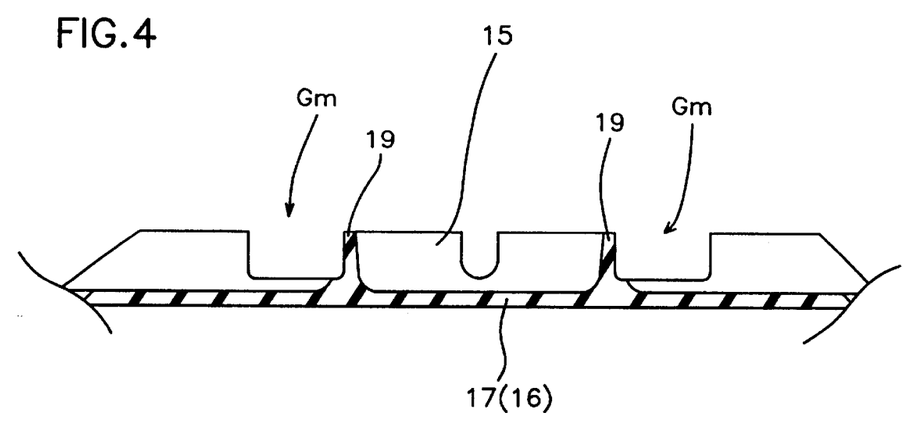
FIG. 4 is a cross sectional view showing another example of the discharge terminal part.

The discharge terminal parts 19 shown in FIG. 3 are disposed in the middle of the axial width of the rib between the circumferential grooves Gm. However, as shown in FIG. 4, the discharge terminal part 19 may be formed along an edge of a rib or a sidewall of a circumferential groove Gm.

Further, the discharge terminal part 19 can be disposed in the tread shoulder part in addition to the tread central part.

Figure 5:
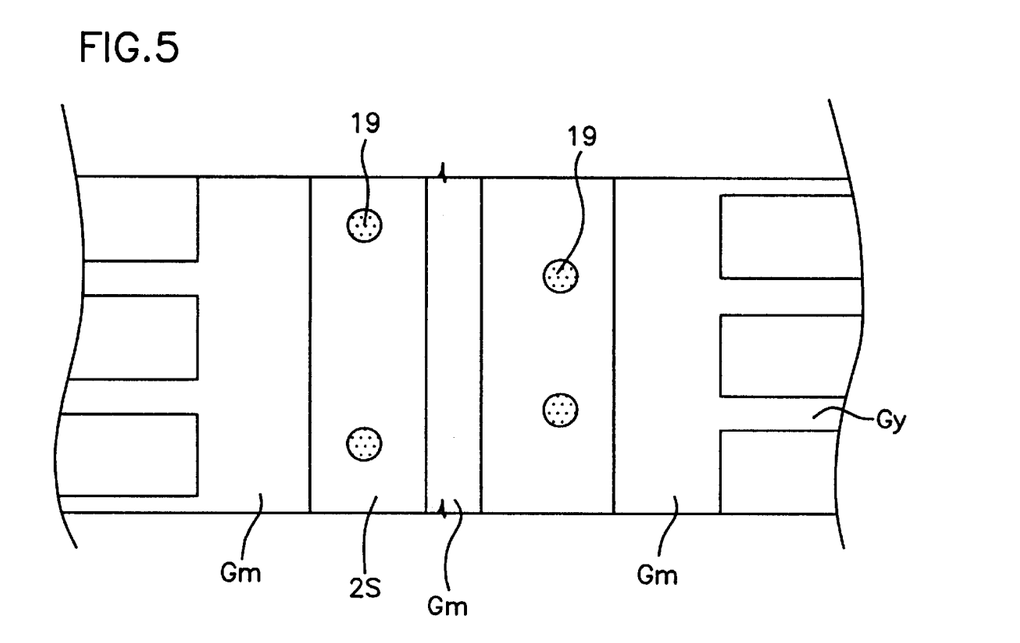
FIG. 5 is a plan view of a tread portion showing still another example of the discharge terminal part.

FIG. 5 shows another example of discontinuous terminal parts 19 completely surround by the insulation rubber material 22. As known from this figure, the discharge terminal part 19 can be formed in another configuration like a column, rectangular pillar and the like. It is preferable that two or more terminal parts 19 always appear in the ground contacting area or footprint of the tire during running.

Comparison Tests

Test tires of size 205/65R15 having the same structure shown in FIG. 1 except the tread rubber were made by way of test and the following tests were made.

Table 1 shows compounds (A1 to A6) used as the tread cap rubber. Table 2 shows compounds (B1 to B6) used as the tread base rubber. Table 3 shows the specifications of the tires and test results. Table 4 shows second electrically conductive rubber compounds used as the belt coating rubber, carcass coating rubber 11, sidewall rubber 27, and clinch rubber 25, and the volume resistivity thereof is also shown, wherein the compound "clinch rubber B" could not make the tire electric resistance less than $1 \times 10^8$ ohm cm.

A) Weathering Resistance Test
Using an outdoor tire drum tester, a test tire was run for 150,000 km under 150% of the standard load and then the tread groove bottom was inspected for cracks.

B) Rolling Resistance Test
The rolling resistance of each test tire was measured with a rolling resistance tester. The results are indicated in Table 3 by an index based on that the test tire 7 is 100. The larger the index, the better the rolling resistance.

C) Wet Performance Test
A passenger car provided on front wheels with test tires was run on a wet asphalt road with a water depth of 5 mm along a 50 meter radius circle, and increasing the running speed step by step, the maximum lateral-G was measured as wet performance. The test results are shown in Table 3, wherein the results are indicated by an index based on that the test tire 7 is 100. The larger the index, the higher the resistance to aquaplane.

D) Straight Running Stability Test
The test car was run on an asphalt paved test course and the handle responsiveness, convergence and ground contact at the time of lane changing were evaluated by the test driver's feelings. The test results are shown in Table 3 by an index based on that the test tire 7 is 100. The larger the index, the better the performance.

E) Electric Resistance Test
The electric resistance of each tire was measured according to W.d.K.—Leitline 110 Blatt 3, as explained above.

TABLE 1

|  | A1 | A2 | A3 | A4 | A5 | A6 | A7 |
|---|---|---|---|---|---|---|---|
| NR | 30.0 | 30.0 | 30.0 |  | 35.0 |  |  |
| S-SBR (*1) | 50.0 | 50.0 | 50.0 |  |  |  |  |
| S-SBR (*2) |  |  |  | 70.0 |  | 60.0 | 70.0 |
| E-SBR (*3) |  |  |  |  | 25.0 | 15.0 |  |
| BR (*4) | 20.0 | 20.0 | 20.0 | 30.0 | 25.0 | 25.0 | 30.0 |
| IR (*5) |  |  |  |  | 15.0 |  |  |
| Silica (*6) | 70.0 | 55.0 | 25.0 |  | 60.0 |  | 110.0 |
| Silica (*7) |  |  |  | 80.0 |  | 60.0 |  |
| Carbon (*8) |  |  |  | 5.0 |  |  | 5.0 |
| Carbon (*9) |  | 15.0 | 45.0 |  | 10.0 | 10.0 |  |
| Total oil (*10) | 40.0 | 40.0 | 30.0 | 60.0 | 40.0 | 40.0 | 70.0 |
| Silane coupling agent (*11) | 5.6 | 4.4 | 2.0 | 6.4 | 4.8 | 4.8 |  |
| Cc/Nc (*12) | 0.0 | 0.94 | 1.61 | 0.63 | 0.63 | 0.63 | 0.63 |
| Volume resistivity (*13) | 13.8 | 13.9 | 5.4 | 13.7 | 13.9 | 13.9 | 13.9 |
| Weathering resistance (*14) | poor | good | good | good | good | good | good |
| JIS-A Hardness (deg) | 62 | 63 | 62 | 64 | 62 | 62 | 66 |
| Tan δ (*15) | 0.16 | 0.17 | 0.26 | 0.20 | 0.16 | 0.19 | 0.24 |
| Wear resistance (*16) | 100 | 102 | 110 | 100 | 102 | 105 | 93 |

TABLE 2

|  | B1 | B2 | B3 | B4 | B5 | B6 | B7 |
|---|---|---|---|---|---|---|---|
| NR | 30.0 | 30.0 | 20.0 |  | 20.0 | 30.0 | 30.0 |
| S-SBR (*1) | 50.0 | 50.0 |  | 40.0 | 60.0 | 20.0 | 20.0 |
| S-SBR (*2) |  |  | 40.0 |  |  |  |  |
| E-SBR (*3) |  |  |  | 20.0 |  |  |  |
| BR (*4) | 20.0 | 20.0 | 40.0 | 20.0 |  | 30.0 | 30.0 |
| IR (*5) |  |  |  | 20.0 | 20.0 | 20.0 | 20.0 |
| Silica (*6) | 55.0 | 30.0 |  |  |  |  |  |
| Silica (*7) |  |  | 30.0 |  |  |  |  |
| Silica (*17) |  |  |  |  |  |  | 50.0 |
| Carbon (*8) | 5.0 |  | 45.0 |  | 60.0 | 50.0 |  |
| Carbon (*9) |  | 30.0 |  | 55.0 |  |  | 30.0 |
| Total oil (*10) | 5.0 | 10.0 | 20.0 |  | 15.0 |  | 20.0 |
| Silane coupling agent (*11) | 4.4 | 2.4 | 2.4 |  |  |  | 13.5 |
| Cc/Nc (*12) | 0.18 | 1.88 | 1.61 | 3.4 | 2.1 | 1.8 | 1.88 |
| Volume resistivity (*13) | 13.8 | 6.3 | 6.6 | 6.2 | 6.7 | 6.9 |  |
| Weathering resistance (*14) | good | good | good | good | good | good | *18 |
| JIS-A Hardness (deg) | 65 | 66 | 67 | 64 | 64 | 64 |  |
| Tan δ (*15) | 0.14 | 0.19 | 0.25 | 0.19 | 0.16 | 0.12 |  |
| Wear resistance (*16) | 96 | 102 | 102 | 106 | 94 | 106 |  |

*1 Styrene 15%, Vinyl 57%, non-oil-extended (NIHON GOUSEI GOMU SL574)
*2 Styrene 30%, Vinyl 45%, 37.5% oil-extended (SUMITOMO KAGAKU)
*3 Styrene 23.5%, Vinyl 18%, non-oil-extended (NIHON GOUSEI GOMU SBR1502)
*4 High-cis BR, Cis form 98% (NIHON ZEON BR1220)
*5 (KARBOCHEM ISOGRIP 3.41R)
*6 BET 175 m$^2$/g, DBP oil absorptiveness 210 ml/100 g (DEGUSSA ULTRASIL VN3)

TABLE 2-continued

|  | B1 | B2 | B3 | B4 | B5 | B6 | B7 |
|---|---|---|---|---|---|---|---|

*7 BET 200 m²/g, DBP oil absorptiveness 190 ml/100 g (NIHON SILICA NIPSIL VN3)
*8 Average particle diameter Nc = 28 nm (SHOWA CABOT N351)
*9 Average particle diameter Nc = 16 nm (MITSUBISHI KAGAKU)
*10 Total of the added process oil and the oil included in polymer if the polymer include oil. Thus, in case of the oil-extended polymer, the listed amount of the polymer does not include the oil.
*11 Vis(triethoxysilylpropyl)tetrasulfide (DEGUSSA Si69)
*12 Ratio Cc/Nc of the carbon content Cc (parts by weight) to the average particle diameter Nc (nm)
*13 indication in Log (ohm·cm). voltage = 1000 volt.
*14 A sheet of the rubber elongated 10% was exposed to sunlight for 30 days and inspected for ozone cracks.
*15 Temperature 70 deg. C, Initial strain 10%, Dynamic distortion plus/minus 1.0%, Frequency 10 Hz
*16 Load 2.0 kg, Slip rate 40%
*17 BET 300 m²/g, CTAB 261 m²/g (DEGUSSA ULTRASIL BV5600)
*18 Because of the high BET, the processability was very poor and a specimen could not be formed. Accordingly, it could not be utilized in making the test tires.

TABLE 4

|  | Belt | Carcass | Sidewall | Clinch A | Clinch B |
|---|---|---|---|---|---|
| NR | 100 | 60 | 50 | 50 | 50 |
| BR (*4) |  |  | 50 | 50 |  |
| E-SBR (*3) |  | 40 |  |  |  |
| Carbon (*8) | 50 | 50 | 50 | 70 | 5 |
| Silica (*6) |  |  |  |  | 70 |
| Volume resistivity (*13) | 6.5 | 6.5 | 6.9 | 6.3 | 13.7 |

TABLE 3

| Tire No. | 1 | 2 | 3 | 4 Ex. | 5 Ex. | 6 | 7 | 8 Ex. |
|---|---|---|---|---|---|---|---|---|
| Tread rubber | | | | | | | | |
| Cap | A1 | A1 | A2 | A2 | A2 | A3 | A3 | A4 |
| Base | B2 | B6 | B1 | B2 | B6 | B3 | B4 | B3 |
| V2/V1 | 0.14 | 0.14 | 0.12 | 0.14 | 0.14 | 0.14 | 0.14 | 0.75 |
| Tan δ 1 | 0.16 | 0.16 | 0.17 | 0.17 | 0.17 | 0.26 | 0.26 | 0.20 |
| Tan δ 2 | 0.19 | 0.12 | 0.14 | 0.19 | 0.12 | 0.25 | 0.19 | 0.25 |
| Hardness (deg) | | | | | | | | |
| Hs1 | 62 | 62 | 63 | 63 | 63 | 67 | 67 | 64 |
| Hs2 | 66 | 63 | 65 | 66 | 63 | 67 | 64 | 67 |
| Wear resistance | | | | | | | | |
| K1 | 100 | 100 | 102 | 102 | 102 | 110 | 110 | 100 |
| K2 | 102 | 106 | 96 | 102 | 106 | 102 | 106 | 102 |
| Terminal part | | | | | | | | |
| Width Wa (mm) | 6.6 | 5.1 | 4.8 | 6.9 | 5.3 | 6.4 | 6.7 | 10.0 |
| Wc (mm) | 8.9 | 7.4 | 7.5 | 9.5 | 7.5 | 8.9 | 9.2 | 15.4 |
| Weathering resistance | poor | poor | good | good | good | good | good | good |
| Rolling resistance | 118 | 118 | 113 | 111 | 111 | 100 | 100 | 100 |
| Wet performance | 112 | 112 | 107 | 105 | 105 | 99 | 100 | 108 |
| Straight running stability | 110 | 106 | 108 | 108 | 106 | 109 | 100 | 106 |
| Electric resistance (log) | | | | | | | | |
| New | 6.8 | 6.8 | 9.3 | 7.2 | 7.2 | 6.4 | 6.4 | 6.4 |
| After 1000 km run | 7.7 | 7.7 | 9.3 | 7.4 | 7.4 | 9.3 | 9.3 | 7.3 |

| Tire No. | 9 Ex. | 10 Ex. | 11 Ex. | 12 | 13 Ex. | 14 Ex. | 15 Ex. |
|---|---|---|---|---|---|---|---|
| Tread rubber | | | | | | | |
| Cap | A4 | A4 | A4 | A4 | A5 | A5 | A6 |
| Base | B3 | B4 | B5 | B6 | B3 | B3 | B4 |
| V2/V1 | 0.37 | 0.41 | 0.12 | 0.41 | 0.12 | 0.31 | 0.14 |
| Tan δ 1 | 0.20 | 0.20 | 0.20 | 0.20 | 0.16 | 0.16 | 0.19 |
| Tan δ 2 | 0.25 | 0.19 | 0.16 | 0.12 | 0.25 | 0.25 | 0.19 |

TABLE 3-continued

| | | | | | | | |
|---|---|---|---|---|---|---|---|
| Hardness (deg) | | | | | | | |
| Hs1 | 64 | 64 | 64 | 64 | 62 | 62 | 62 |
| Hs2 | 67 | 64 | 64 | 63 | 67 | 67 | 64 |
| Wear resistance | | | | | | | |
| K1 | 100 | 100 | 100 | 100 | 102 | 102 | 105 |
| K2 | 102 | 106 | 97 | 106 | 102 | 102 | 106 |
| Terminal part | | | | | | | |
| Width Wa (mm) | 25.0 | 3.4 | 4.2 | 6.7 | 1.1 | 15.4 | 6.5 |
| Wc (mm) | 32.0 | 6.3 | 8.5 | 9.4 | 4.3 | 6.8 | 9.3 |
| Weathering resistance | good | good | good | good | good | good | good |
| Rolling resistance | 100 | 107 | 109 | 103 | 112 | 107 | 112 |
| Wet performance | 100 | 110 | 110 | 111 | 107 | 104 | 109 |
| Straight running stability | 109 | 106 | 105 | 104 | 113 | 97 | 108 |
| Electric resistance (log) | | | | | | | |
| New | 6.8 | 6.2 | 5.8 | 7.2 | 7.2 | 6.9 | 6.8 |
| After 1000 km run | 7.4 | 7.6 | 8.9 | 7.6 | 8.7 | 7.7 | 7.4 |

As to Test tires 1, 2, 3, 6, 7 and 12 which are reference tires:

The tires 1 and 2 were better in the rolling resistance, wet performance, straight running stability and tire electric resistance, but the weathering resistance was poor because the tread cap rubber 15 did not contain carbon black. Test tire 3 had not a necessary electric resistance since the tread base rubber 16 had a high volume resistivity. Test tires 6 and 7 were not improved in the rolling resistance and wet performance as the tread cap rubber 15 had a high carbon black content. Further, as the wear resistance K2 of the tread base rubber 16 was lower than the wear resistance K1 of the tread cap rubber 15, the ground pressure of the discharge terminal parts 19 decreased to worsen the tire electric resistance after the 1000 km running.

This tendency also appeared in Test tire 11. In Test tire 12, as the hardness HS2 of the tread base rubber 16 was less than the hardness HS1 of the tread cap rubber 15, a desirable straight running stability and steering stability could not be obtained.

As to Test tire 4, 5, 8, 9, 10, 11, 13, 14 and 15 which are Example tires of the invention:

In Test tire 8, as the volume ratio V1/V2 of the tread base rubber 16 was relatively large, the rolling resistance was somewhat deteriorated.

In Test tire 9, as the width Wa of the discharge terminal parts 19 became too large to decrease the ground contacting area of the tread cap rubber 15, the rolling resistance and wet performance could not be fully improved.

As described above, in the tires according to the present invention, static electricity can be easily discharge from the car to the road surface, and the rolling resistance and wet performance are improved, without sacrificing the steering stability. Further, these improved performances can be maintained from the initial stage to the final stage of the tread wear life.

What is claimed is:

1. A pneumatic tire comprising
a tread portion with a tread face for contacting the ground,
a pair of sidewall portions,
a pair of bead portions with a bead core therein,
a carcass extending between the bead portions,
a belt disposed radially outside the carcass and radially inside the tread portion,
said tread portion comprising
 a tread cap rubber and
 a tread base rubber disposed radially inside the tread cap rubber,
said tread base rubber comprising
 a collector part disposed radially inside the tread cap rubber and
 discharge terminal parts extending radially outwardly from the collector part to the tread face, penetrating the tread cap rubber,
the tread cap rubber being made of an insulation rubber material the volume resistivity of which is not less than $1 \times 10^8$ ohm cm,
the insulation rubber material compounded from 100 parts by weight of a rubber base comprising one or more materials selected from diene rubber and copolymers of a conjugated diene monomer and an aromatic vinyl compound,
30 to 100 parts by weight of silica, and 3 to 20 parts by weight of carbon black,
the tread base rubber being made of a first electrically conductive rubber material the volume resistivity of which is not more than $1 \times 10^7$ ohm cm,
the first electrically conductive rubber material compounded from 100 parts by weight of a rubber base comprising one or more materials selected from diene rubber and copolymers of a conjugated diene monomer and an aromatic vinyl compound,
0 to 50 parts by weight of silica, and
not less than 25 parts by weight of carbon black,
an electrical conductor extending from said collector part to the bead portions,
the hardness Hs1 of the insulation rubber material being less than the hardness Hs2 of the first electrically conductive rubber material at a temperature of 25 degrees C., and
the loss tangent $\delta 2$ of the first electrically conductive rubber material being less than the loss tangent $\delta 1$ of the insulation rubber material,
the wear resistance of the first electrically conductive rubber material being higher than the wear resistance of the insulation rubber material,
said discharge terminal parts defining a first portion of the tread face and said tread cap rubber defining a second portion which is the remaining part of the tread face, whereby in the tread face the first portion and second portion are different from each other with respect to hardness, loss tangent and wear resistance such that in comparison with the second portion the first portion is higher in hardness, lower in loss tangent and higher in wear resistance, and wherein said discharge terminal parts include a mushroom shaped discharge terminal part which comprises a wide part at the tread face and a radially inner narrow main part extending from the wide part to the collector part.

2. A pneumatic tire according to claim 1, wherein
said electrical conductor is made of a second electrically conductive rubber material having a volume resistivity of not more than $1 \times 10^7$ ohm cm,
said second electrically conductive rubber material compounded from
   100 parts by weight of a rubber base comprising one or more materials selected from
      diene rubber and
      copolymers of a conjugated diene monomer and an aromatic vinyl compound,
   0 to 50 parts by weight of silica, and
   not less than 25 parts by weight of carbon black.

3. A pneumatic tire according to claim 2, wherein said electrical conductor comprises:
   a coating rubber for the belt directly contacting with the tread base rubber;
   a clinch rubber disposed in the bead portion for contacting with a wheel rim when the tire is mounted thereon; and
   a coating rubber for the carcass and/or a sidewall rubber defining the sidewall portion contacting with the belt coating rubber and the clinch rubber.

4. A pneumatic tire according to claim 2, wherein in the second electrically conductive rubber material the surface area based on nitrogen absorption (BET) of the silica is in the range of from 150 to 150 m²/g, and the dibutyl phthalate (DBP) oil absorptiveness of the silica is not less than 200 ml/100 g, and
   a ratio Cc/Nc of the content Cc in parts by weight and average particle diameter Nc in nm of the carbon black is not less than 1.5.

5. A pneumatic tire according to claim 1, wherein in the first electrically conductive rubber material, the surface area based on nitrogen absorption (BET) of the silica is in the range of from 150 to 250 m²/g, and the dibutyl phthalate (DBP) oil absorptiveness of the silica is not less than 180 ml/100 g, and
   a ratio Cc/Nc of the content Cc in parts by weight and average particle diameter Nc in nm of the carbon black is not less than 1.5.

6. A pneumatic tire according to claim 1, or wherein
the ratio V2/V1 of the volume V2 of the tread base rubber to the volume V1 of the tread cap rubber is not more than 0.5.

7. A pneumatic tire according to claim 1, wherein the loss tangent $\delta 2$ is in the range of not less than 0.09; and
   wherein the loss tangent $\delta 2$ is measured under conditions of a temperature of 70° C., an initial elongation of 10%, and a frequency of 10 Hz.

8. A pneumatic tire according to claim 1, wherein the collector part extends axially beyond the axially outer edges of the belt, and along the entire circumference of the tread portion.

9. A pneumatic tire comprising
a tread portion with a tread face for contacting the ground,
a pair of sidewall portions,
a pair of bead portions with a bead core therein,
a carcass extending between the bead portions,
a belt disposed radially outside the carcass and radially inside the tread portion,
said tread portion comprising
a tread cap rubber and
a tread base rubber disposed radially inside the tread cap rubber,
said tread base rubber comprising
   a collector part disposed inside the tread cap rubber and
   discharge terminal parts extending outwardly from the collector part to the tread face, penetrating the tread cap rubber,
   the tread cap rubber being made of an insulation rubber material the volume resistivity of which is not less than $1 \times 10^8$ ohm cm,
   the insulation rubber material compounded from
   100 parts by weight of rubber base comprising one or more materials selected from diene rubber and copolymers of a conjugated diene monomer and an aromatic vinyl compound,
   30 to 100 parts by weight of silica, and
   3 to 20 parts by weight of carbon black,
   the tread base rubber being made of a first electrically conductive rubber material the volume resistivity of which is not more than $1 \times 10^7$ ohm cm,
   the first electrically conductive rubber material compounded from
   100 parts by weight of a rubber base comprising one or more materials selected from diene rubber and copolymers of a conjugated diene monomer and an aromatic vinyl compound,
0 to 50 parts by weight of silica,
not less than 25 parts by weight of carbon black,
an electrical conductor extending from said collector part to the bead portions,
the hardness Hs1 of the insulation rubber material being not more than the hardness Hs2 of the first electrically conductive rubber material at a temperature of 25 degrees C., and the loss tangent $\delta 2$ of end of the first electrically conductive rubber material being less than the loss tangent $\delta 1$ of the insulation rubber material, wherein said discharge terminal parts include a mushroom shaped discharge terminal part which comprises a wide part at the tread face and a main part, the main part having an axially width which gradually decreases from the collector part towards the wide part at the tread face.

* * * * *